United States Patent [19]
Bracey et al.

[11] 3,958,887
[45] May 25, 1976

[54] SHAFT COUPLINGS

[75] Inventors: Kenneth Edward George Bracey, Findern; James Alexander Petrie, Littleover, both of England

[73] Assignee: Rolls-Royce (1971) Limited, London, England

[22] Filed: Nov. 5, 1974

[21] Appl. No.: 521,139

[30] Foreign Application Priority Data
Nov. 13, 1973 United Kingdom.............. 52513/73

[52] U.S. Cl...................................... 403/9; 403/20; 403/328; 403/317
[51] Int. Cl.²........................................... F16D 1/06
[58] Field of Search.......... 403/359, 322, 328, 320, 403/316, 317, 19, 20, 9; 64/9 R

[56] References Cited
UNITED STATES PATENTS

| | | | |
|---|---|---|---|
| 2,785,550 | 3/1957 | Petrie | 403/316 X |
| 3,449,926 | 6/1969 | Hawkins | 403/359 X |
| 3,469,868 | 9/1969 | Freeman et al. | 403/316 |

FOREIGN PATENTS OR APPLICATIONS
1,284,709   8/1972   United Kingdom

*Primary Examiner*—Andrew V. Kundrat
*Attorney, Agent, or Firm*—Cushman, Darby & Cushman

[57] ABSTRACT

The invention relates to a shaft coupling assembly wherein two shafts are rotationally located with respect of each other by means of splines provided upon the two shafts. The shafts are located axially by the provision of a further member being provided with similar splines, the third member being adapted to be rotated such that its splines may be brought out of engagement with the other splines to lock them together axially. The third member is rotated by means of a bevel gear arrangement which are rotated by means of an adjusting tool. The arrangement is such that the adjusting tool may only be removed when the third member is in the locked position.

6 Claims, 4 Drawing Figures

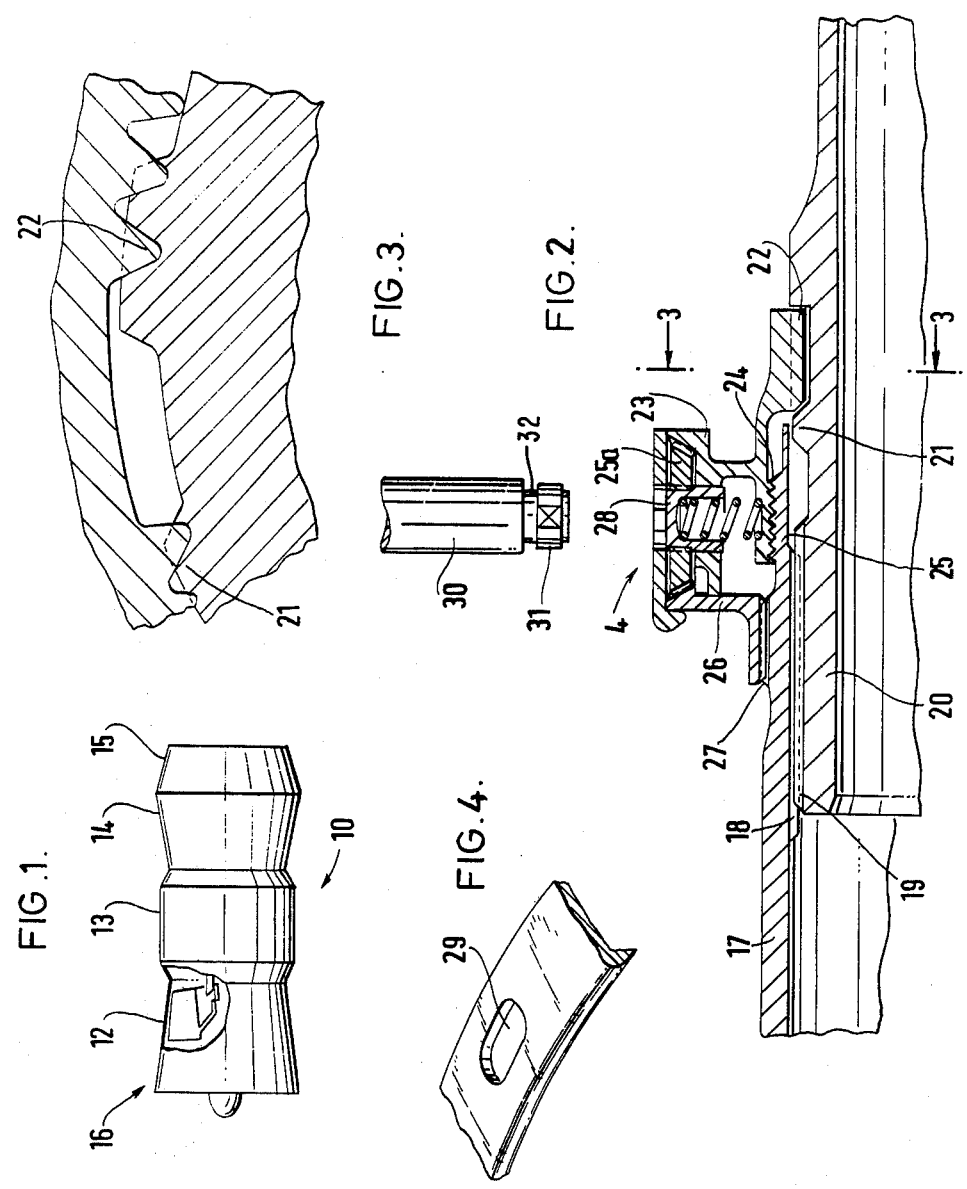

SHAFT COUPLINGS

This invention concerns a shaft coupling assembly and more particularly a shaft coupling assembly suitable for securing together two gas turbine engine main shaft portions in the confines of a gas turbine engine.

It has been well known in the past to provide various coupling arrangements to secure together separate portions of gas turbine engine shafts. However, some of these have suffered from a disadvantage in that the locking has usually necessitated passing a suitable locking tool down the central portion of the shaft to lock the coupling assembly.

This has not always been desirable in that it has been necessary to design the engine such as to gain access to the central portion of the shaft. In the case of a three shaft gas turbine engine it is virtually impossible to gain access to the intermediate shaft to lock a coupling assembly.

An alternative type of coupling assembly is locked by passing a suitably shaped locking tool radially inwardly through a hollow strut provided on the engine, however, most of these coupling arrangements suffer the disadvantage that it is extremely difficult to ensure that the coupling is correctly locked.

A further disadvantage with both the abovementioned types of shaft coupling is that they are usually arranged such that the two shaft portions may only be secured to each other in one axial location.

An object of the present invention is to provide a shaft coupling arrangement which provides for a degree of axial adjustment of the two respective shaft portions.

A further object of the invention is to provide a shaft coupling arrangement with a feature which ensures the two shaft portions may be securely locked relative to each other.

Accordng to the present invention a shaft coupling assembly adapted to secure axially together two axially extending shaft portions of a gas turbine engine main shaft which are rotationally secured with respect to each other by means of a common set of co-operating splines, comprises a coupling assembly arranged radially outwardly of the shaft portions which is adapted to secure the shaft portions axially with respect of each other and which also provides a degree of axial adjustment between the two shaft members and includes a cylindrical coupling member having means co-operating with means on each of the shaft portions for normally preventing relative axial movement between the two shaft portions, one of said means being such as to cause relative axial movement of the shafts when one or both of the shaft portions rotate relatively to the coupling member, releasable means normally preventing said relative rotation, which means is releasable by an adjusting tool when relative axial adjustment is required, and means rotatable by the tool to cause said relative rotation between the member and the shaft portion or portions, and means preventing removal of the tool until the releasable means is re-engaged.

Preferably both the locking and adjustment is performed by the combination of a screw threaded connection which is provided between the cylindrical coupling assembly and the first shaft portion, and a splined connection between the cylindrical coupling assembly and the other shaft portion.

According to a further aspect of the invention the first shaft portion is adapted to be moved axially with respect of the cylindrical coupling member by means of the screw threaded connection provided between the two members the first shaft portion being rotated relative to the cylindrical coupling by means of a bevel gear arrangement provided between the first shaft portion and the cylindrical coupling member.

Preferably the bevel gear arrangement is adapted to be rotated by means of an adjusting tool which is adapted to co-operate with the bevel gear provided within the cylindrical coupling member.

The bevel gear provided within the cylindrical coupling member may be adapted to be locked in a desired position upon removal of the adjusting tool by means of a spring loaded splined pin arrangement provided within the cylindrical coupling member which co-operates with corresponding splines provided within the bevel gear and also in fixed structure adjacent the bevel gear.

According to yet a further aspect of the present invention the adjusting tool used for rotating the bevel gear provided within the cylindrical coupling assembly is of generally cylindrical cross-section and is provided with two opposed flats upon the portion which mates with the bevel gear and is adapted to pass through an aperture of a corresponding shape provided within the outer periphery of the cylindrical assembly, the arrangements being such that the adjusting tool may only be placed within or removed from the bevel gear in two locations the first being at 180° to the other, the two locations being chosen such that the tool may only be removed when the coupling is axially secured to the two shaft portions.

The two shaft portions may be adapted to be secured axially by means of the splines provided upon the cylindrical coupling member which are arranged in a circumferentially extending groove provided upon the second shaft member the arrangement being such that the cylindrical member may be indexed by means of the bevel gears such as to bring the splines provided upon the second shaft portion such as to prevent any relative axial movement in one direction between the two said members.

The invention will be more particularly described by way of example only and with reference to the accompanying drawings in which:

FIG. 1 shows a pictorial view of a gas turbine engine having a broken away casing portion disclosing a diagrammatic view of an embodiment of the present invention.

FIG. 2 shows an enlarged cross-sectional view in greater detail of the embodiment shown in FIG. 1.

FIG. 3 shows a cross-sectional view of a spline arrangement shown at 3—3 at FIG. 2.

FIG. 4 shows a pictorial view of a portion of the assembly shown at arrow 4 at FIG. 2.

Referring to FIG. 1 of the drawings a gas turbine engine shown generally at 10 comprises in flow series a compressor section 12, combustion equipment 13, and a turbine section 14 terminating in exhaust nozzle 15. The compressor section 12 and turbine section 14 are rotatably mount ed upon a common shaft arrangement not shown. Shown generally at 16 is a broken away casing portion showing a diagrammatic view of an embodiment of the present invention.

FIG. 2 shows a greatly enlarged cross-sectional view of the embodiment shown diagrammatically at 16 in FIG. 1 and illustrates a first shaft portion 17 provided with a circumferential array of axially extending internal splines 18 which co-operate with a further set of splines 19 provided externally upon the second shaft portion 20 which is disposed internally of shaft portion 17. Also arranged on the shaft portion 20 is a further array of relatively short axially extending splines 21 which are fewer in number than the splines shown at 19. These splines 21 are in turn adapted to co-operate with a further array of splines 22 provided upon the internal surface of an annular member 23. There is also provided upon a further surface within annular member 13, a screw threaded portion 24 which in turn co-operates with an externally screw threaded portion 25 of the shaft portion 17.

Rotatably mounted with the annular member 23 is a bevel gear 252 which co-operates with a further bevel gear 26 which is splined to shaft portion 17 by means of co-operating splines 27.

Arranged within and co-operating with an internal bore of the bevel gear 252 and the adjacent portion of the annular member 23 is disposed a spring urged plunger member 28 which is provided upon its external diameter with a plurality of splines (not shown in the drawings) which co-operate with further splines provided upon the internal diameter of bevel gear 252 and a further internal diameter provided within the annular member 23 such that the bevel gear 252 and the annular member 23 may be rotationally locked with respect to each other.

As will be seen at FIG. 4 each hole 29 in the annular member 23 takes the form of an elongate slot which is of substantially the same shape as the end 31 of the adjusting tool 30. It will be appreciated that when the adjusting tool 30 has entered the hole 29, the tool will be freely rotatable in hole 29 by virtue of recess 32 provided on adjusting tool 30.

Axial adjustment or parting of the two shaft portions 17 and 20 is carried out as follows. The adjusting tool end 31 is aligned with and passes through hole 29 on the annular member 23 such that it may co-operate with the splines provided upon the internal surface of the bevel gear 252, in so doing it will depress plunger 28 radially inwardly and thus allow the bevel gear 252 to be freely rotatable with respect to annular member 23. The adjusting tool 30 may then be rotated such as to transmit rotational movement via gears 252 and 26 through splines 27 to shaft 17 such as to provide a rotational movement between shaft 17 and annular member 23 and thus allow the shaft portion to move axially by means of screw thread 24.

It will be understood that rotation of shaft portion 17 relative to the annular member 23 also results in rotation of annular member 23 with respect to shaft portion 20 by virtue of the shaft portions being splined at 18 and 19 it will therefore be understood that this will result in the splines 21 and 22 being allowed to move into axial alignment such that the two shaft portions may be pulled axially to part them from each other.

It will be apparent that by suitable choice of gear ratio between the bevel gears 252 and 26 it is possible to arrange that 180° of movement of the adjusting tool 30 results in moving the splines 22 and 21 from one fully engaged position to the next fully engaged position and it is arranged such that the tool 30 can only be removed in these positions.

If the tool is rotated only 90° the splined shafts 17 and 20 can be disengaged, the tool 30 is then retained in its operative position by means of the flats provided within the slot 29 projecting into the groove 32 provided upon the adjusting tool. Therefore the adjusting tool 30 cannot be further rotated to facilitate removal without either locking the shafts together or alternatively the shafts must be completely parted to permit further rotation.

Subsequent removal of the adjusting tool 30 from the hole 29 will result in the spring load plunger 28 moving radially outwards into the splines provided within the internal diameter of the bevel gear 252 thus locking the coupling.

We claim:

1. A shaft coupling assembly adapted to secure together two coaxially extending concentric shaft portions of a gas turbine engine main shaft which are rotationally secured with respect to each other by means of a common set of co-operating splines, the coupling assembly being arranged radially outwardly of the shaft portions and adapted to secure the two shaft portions axially with respect to each other, and which also provides a degree of axial adjustment between the two shaft portions, the improvement including, a cylindrical coupling member having means co-operating with means on each of the shaft portions for normally preventing relative axial movement between the two shaft portions, one of said means being such as to cause relative axial movement of the two shaft portions when one or both of the shaft portions rotate relative to the cylindrical coupling member, said one of said means for causing relative axial movement of the shaft portions including a screw threaded connection between one of said shaft portions and said cylindrical coupling member and a bevel gear arrangement provided between the one of said shaft portions and said cylindrical coupling member for rotating said one of said shaft portions relative to said cylindrical coupling member, releasable means normally preventing said relative rotation, an adjusting tool insertable radially into said cylindrical coupling member for releasing said releasable means and engaging said bevel gear arrangement when relative axial adjustment is required, and means preventing removal of said adjusting tool until the releasable means are engaged.

2. A shaft coupling assembly as claimed in 1 wherein the improvement comprises that both the locking and the adjusting are performed by a combination of said screw threaded connection which is provided between the cylindrical coupling member and the one of said shaft portions and a splined connection between the cylindrical coupling member and the other of said shaft portions.

3. A shaft coupling assembly as claimed in claim 1 in which said bevel gear arrangement is provided within the cylindrical coupling member.

4. A shaft coupling assembly as claimed in claim 1 wherein the improvement comprises in that the bevel gear arrangement is provided within the cylindrical coupling member and may be adapted to be locked in a desired position upon removal of the adjusting tool by means of a spring loaded splined pin arrangement provided within the cylindrical coupling member which co-operates with corresponding splines provided within the bevel gear arrangement and also in fixed structure adjacent to the bevel gear arrangement.

5. A shaft coupling assembly as claimed in claim 1 wherein the improvement comprises in that the adjusting tool is used for rotating the bevel gear arrangement within the cylindrical coupling member and is generally cylindrical cross-section and is provided with two opposed flats upon the portion which mates with the bevel gear arrangement, and is adapted to pass through an aperture of a corresponding shape provided within the outer periphery of the cylindrical coupling member, the arrangement being such that the adjusting tool may only be placed within or removed from the bevel gear arrangement in two locations, the first being at 180° to the other, the two locations being chosen such that the tool may only be removed when the coupling is actually secured to the two shaft portions.

6. A coupling assembly as claimed in claim 1 wherein the improvement comprises that the two shaft portions may be adapted to be secured axially by means of splines provided upon the cylindrical coupling member which are arranged in a circumferentially extending groove provided upon the other of said shaft portions, the arrangement being such that the cylindrical coupling member may be indexed by means of the bevel gear arrangement such as to bring a spline provided upon the other of said shaft portions, out of alignment with the splines on said cylindrical coupling member to prevent any relative axial movement in one direction between the cylindrical coupling member and the other of said shaft portions.

* * * * *